United States Patent
Shaffer et al.

[11] Patent Number: 5,849,131
[45] Date of Patent: Dec. 15, 1998

[54] METHOD FOR APPLYING ADHESIVE TO AN INSULATION ASSEMBLY

[75] Inventors: Roy E. Shaffer, Granville; Frederick R. Ernest, St. Louisville; Jeffrey A. Tilton, Granville, all of Ohio

[73] Assignee: Owens Corning Fiberglas Technology, Inc., Summit, Ill.

[21] Appl. No.: 865,644

[22] Filed: May 30, 1997

Related U.S. Application Data

[62] Division of Ser. No. 684,507, Jul. 19, 1996, abandoned, which is a continuation of Ser. No. 483,787, Jun. 7, 1995, abandoned, which is a division of Ser. No. 371,739, Jan. 12, 1995, abandoned.

[51] Int. Cl.$^6$ .................................. C09J 5/04; C09J 5/06
[52] U.S. Cl. ........................ 156/285; 156/334; 156/71; 156/305; 442/150
[58] Field of Search ................................. 156/285, 334, 156/71, 305; 442/150, 151

[56] References Cited

U.S. PATENT DOCUMENTS

| | | |
|---|---|---|
| 3,507,733 | 4/1970 | Davidson . |
| 3,598,679 | 8/1971 | Ettre et al. . |
| 3,888,716 | 6/1975 | Morse . |
| 3,991,232 | 11/1976 | Kamiuchi et al. . |
| 4,013,812 | 3/1977 | Geiger . |
| 4,134,948 | 1/1979 | Baker, Jr. . |
| 4,151,319 | 4/1979 | Sackoff et al. . |
| 4,208,230 | 6/1980 | Magarian . |
| 4,430,147 | 2/1984 | Harston et al. . |
| 4,488,335 | 12/1984 | Fox et al. ................................... 24/304 |
| 4,619,854 | 10/1986 | Penttinen . |
| 4,668,562 | 5/1987 | Street . |
| 4,722,857 | 2/1988 | Tomioka et al. . |
| 4,753,693 | 6/1988 | Street . |
| 4,764,234 | 8/1988 | Smits et al. . |
| 4,803,115 | 2/1989 | Fushiki et al. . |
| 5,104,701 | 4/1992 | Cohen et al. . |
| 5,106,447 | 4/1992 | Di Rado et al. . |
| 5,112,678 | 5/1992 | Gay et al. . |
| 5,123,453 | 6/1992 | Robbins . |
| 5,141,793 | 8/1992 | Fontanilla . |
| 5,234,520 | 8/1993 | McClintock . |
| 5,240,527 | 8/1993 | Lostak et al. . |
| 5,246,514 | 9/1993 | Alderman et al. . |
| 5,248,551 | 9/1993 | Kelman et al. . |
| 5,284,702 | 2/1994 | Umemoto et al. . |
| 5,298,318 | 3/1994 | Soules et al. . |
| 5,359,735 | 11/1994 | Stockwell . |
| 5,359,739 | 11/1994 | Rains . |
| 5,389,167 | 2/1995 | Sperber . |
| 5,496,603 | 3/1996 | Riedel et al. ....................... 442/151 X |

FOREIGN PATENT DOCUMENTS

| | | |
|---|---|---|
| 629153B1 | 12/1994 | European Pat. Off. . |
| 0 629 153 B1 | 10/1996 | European Pat. Off. . |
| 6158004 | 11/1992 | Japan . |
| 1520779 | 8/1978 | United Kingdom . |

*Primary Examiner*—Daniel Zirker
*Attorney, Agent, or Firm*—C. Michael Gegenheimer; Curtis B. Brueske; Robert L. Showalter

[57] ABSTRACT

Our unique process applies pressure sensitive hot melt adhesive to fiberglass insulation with improved adhesion to the insulation surface and the adjoining substrate. As opposed to the typical spray or bead extrusion methods, the preferred embodiment applies a ribbon of adhesive to the blanket and pulls it into the insulating glass with a vacuum. The adhesive penetrates the glass and becomes an integral part of the insulating blanket.

17 Claims, 2 Drawing Sheets

METHOD FOR APPLYING ADHESIVE TO AN INSULATION ASSEMBLY

CROSS-REFERENCE TO RELATED APPLICATION

This is a division of U.S. patent application Ser. No. 08/684,507, filed Jul. 19, 1996, abandoned which is a file wrapper continuation of U.S. patent application Ser. No. 08/483,787, filed Jun. 7, 1995, now abandoned which was a divisional of U.S. patent application Ser. No. 08/371,739, filed Jan. 12, 1995, now abandoned.

TECHNICAL FIELD

This invention is a designed insulation assembly and process to produce a peel and stick insulation product with improved product properties than what can be obtained with traditional hot melt pressure sensitive adhesive application methods. The peel and stick product also eliminates the undesirable process of spraying solvent borne and latex adhesives to insulating fiberglass for HVAC and other OEM equipment.

BACKGROUND OF THE INVENTION

The process of applying a hot melt adhesive to fiberglass insulation is known. See U.S. Pat. No. 5,106,447. A fiberglass product with a pre-applied pressure sensitive adhesive that provides peel and stick qualities is desired by the end use customer. Traditional methods of applying hot melt adhesives to fiberglass insulation allow the adhesive to adhere only to the surface fibers. This poor contact and surface dust result in a weak interfacial bond between the fiberglass product and the adhesive. Applications of free films and tapes also have been unsuccessful in providing adequate adhesion between the glass and the adhesive.

DISCLOSURE OF INVENTION

Our unique process applies pressure sensitive hot melt adhesive to fiberglass insulation with improved adhesion to the insulation surface and the adjoining substrate. As opposed to the typical spray or bead extrusion methods, a ribbon of adhesive is applied and pulled into the blanket of the insulating glass with a vacuum. The adhesive penetrates the glass and becomes an integral part of the insulating blanket. Our process allows for the use of traditional hot melt adhesives, but is not limited to hot melts for bonding fiberglass to a variety of surfaces.

In another embodiment, we have found that moving the insulation away from the adhesive application at a descending angle also improves the application of the adhesive. In many instances, the descending angle can be used without the vacuum. The insulation may advance towards the application on a horizontal plane or at an ascending angle.

BEST MODE OF CARRYING OUT INVENTION

Figure 1:
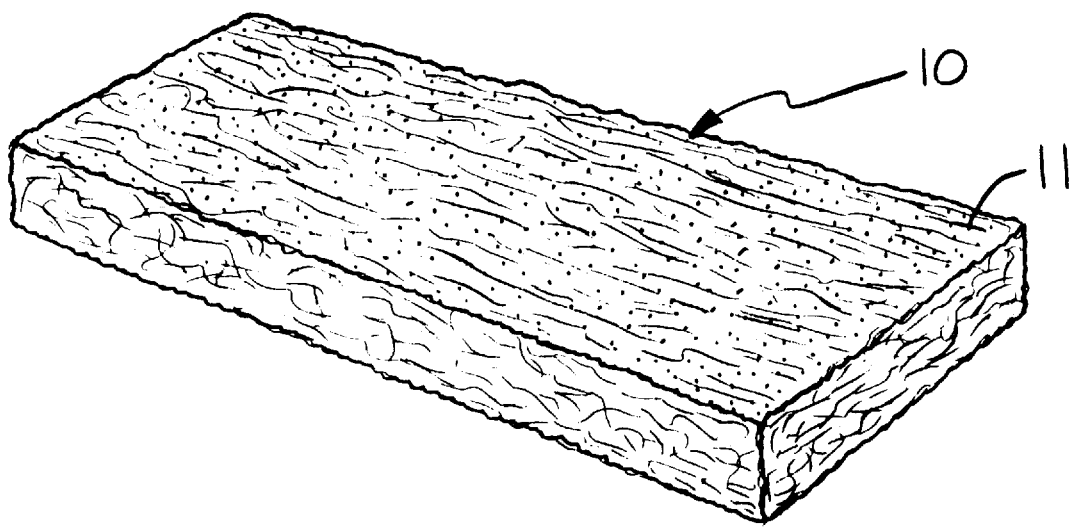
FIG. 1 is a view of an insulation assembly showing an adhesive pulled into the insulation pack.

A vacuum slot, located directly under the adhesive extrusion head, is used to pull the adhesive into the wool. The vacuum draws through the fiberglass blanket and pull the adhesive stripes into the fiberglass substrate or pack. This action of the vacuum improves adhesion between the adhesive film and the wool by impregnating the wool with the adhesive film. The vacuum also serves to provide a positive contact with the wool during the application process to prevent voids from forming in the adhesive film. This function of the vacuum is especially important when extruding high viscosity adhesives or when the adhesive film cannot adequately "wet out" the substrate. Poor "wet out" causes the adhesive to concentrate in areas leaving "blobs" and to "skip" or leave areas void of adhesive. The vacuum provides for an even coat, allowing the maximum surface area of the adhesive to be available to contact with both the fiberglass and the adhering substrate. Maximizing the area of contact is key to the adhesion performance adhesives in the end use application.

In another embodiment, we have found that moving the insulation away from the adhesive application at a descending angle also improves the application of the adhesive. In many instances, the descending angle can be used without the vacuum. The insulation may advance towards the application on a horizontal plane or at an ascending angle.

The descending angle means the insulation angles away from the horizontal. Typically, insulation moves on a horizontal plane and the adhesive is applied in a direction perpendicular to the horizontal plane. When moving the insulation towards the application at an ascending angle, the insulation actually forms a peak beneath the applicator and above the vacuum. Either angle can vary widely. Typically, an angle of 5° or 10° is sufficient to prevent poor "wet out", "blobs" or "skips".

Other means of applying a differential pressure can be used to replace or facilitate the action of the vacuum on the adhesive. Pressure applied by a blower or a compressed air source has also been used with limited success. An air knife was used to pressure the adhesive into the wool immediately after it was applied. Although heated air applied by the use of an air knife did improve the application efficiency of the adhesive without leaving voids the process window was much smaller than with the use of vacuum. The use of vacuum and forced air was used with equal success as with vacuum used alone.

The adhesive may be of any of those well known to the insulation art. The adhesive generally is applied in varying thickness ranging from about 5 mil to about 40 mils, with a desirable thickness being 10 to 20 mils and the preferred thickness is about 15 mils, depending on the nature of the insulation. Common or conventional adhesives, preferably of the pressure sensitive type may be utilized, such as an adhesive containing an acrylic base which may be formulated to any specific purpose. For example, the adhesive may include flame retardants and like additives. Another common class is that of the elastomer-based adhesives or the hot melt adhesives. These may be formulated for specific purposes, i.e., dyes, antioxidants and related adhesive additives or solvents may be included. Specific examples of rubber-based pressure adhesives are blends of styrenebutadiene rubber, polyisoprene and related dienes or olefin polymers, with suitable tackifiers such as those commercially available. Prior to using our vacuum step, the adhesive is applied by any of the conventional means of applying adhesives, such as coating, doctoring or brushing.

The hot melt adhesive also may be isostatic thermoplastic polybutene-1/ethylene copolymer. The polybutylene copolymers are copolymers of polybutene-1 and ethylene wherein the ethylene content varies from about 5.5 to about 10% by weight of the copolymer. The applicable isotactic polybutylenes are relatively rigid while in their plastic form but flow readily upon being heated.

Generally, any conventional release coat may be utilized such as a silicone coat. The release strip may vary in thickness from about 0.5 to 5 or 6 mils or more, with the cost being usually a controlling factor as well as flexibility. A desirable thickness, in most instances, is 1 to 4 mils and preferably 2 to 3 mils depending on use. The release coat is applied to a carrier strip such as Kraft paper, polyethylene-coated paper or film and the like. The release agent can be coated on the carrier strip by any of the well known ways such as by roll coating or Rotogravure printing.

Fibrous glass wool insulation often combines a binder, such as a phenolic resin with glass wool subsequent to the fiberizing process. The resultant insulating material assembly had sufficient strength to support itself in long strips so that it could be, for example, placed between adjacent wall studs or ceiling trusses in a commercial or residential building.

Glass fiber insulation is generally made by laying down a blanket of multiple horizontal layers of glass fibers onto a moving belt. Thus, current practice applies binder materials to the fibers as the insulation blanket is being formed, and to partially compress and heat the resulting blanket to cure the binder. The blanket is thereafter cut into batts or rolls and tightly compressed for packaging and transport.

Recent inventions relate to insulation assemblies in which all binder or essentially all of the binder is eliminated. The binderless batt may be enclosed by an exterior layer to form a low density insulation assembly having satisfactory resiliency. The insulation assembly of this invention may include a binder or be binderless.

Referring to FIG. 1, an insulation assembly, according to the present invention, is generally indicated by the reference number 10. The insulation assembly 10 includes a mineral fiber batt such as a fibrous glass batt 11. The term "batt" refers to a mineral fiber batt. The body of the batt is self supporting and does not disintegrate or fall apart as would be true of, for example, individual units of fibrous glass loose fill material. Accordingly, the mineral fiber batt 11 has integrity and is capable of being picked and remain intact.

The density of mineral fiber batt 11 can vary widely. Typically, the density ranges from 0.5 to 10.0 pounds per cubic foot (pcf).

Figure 2:
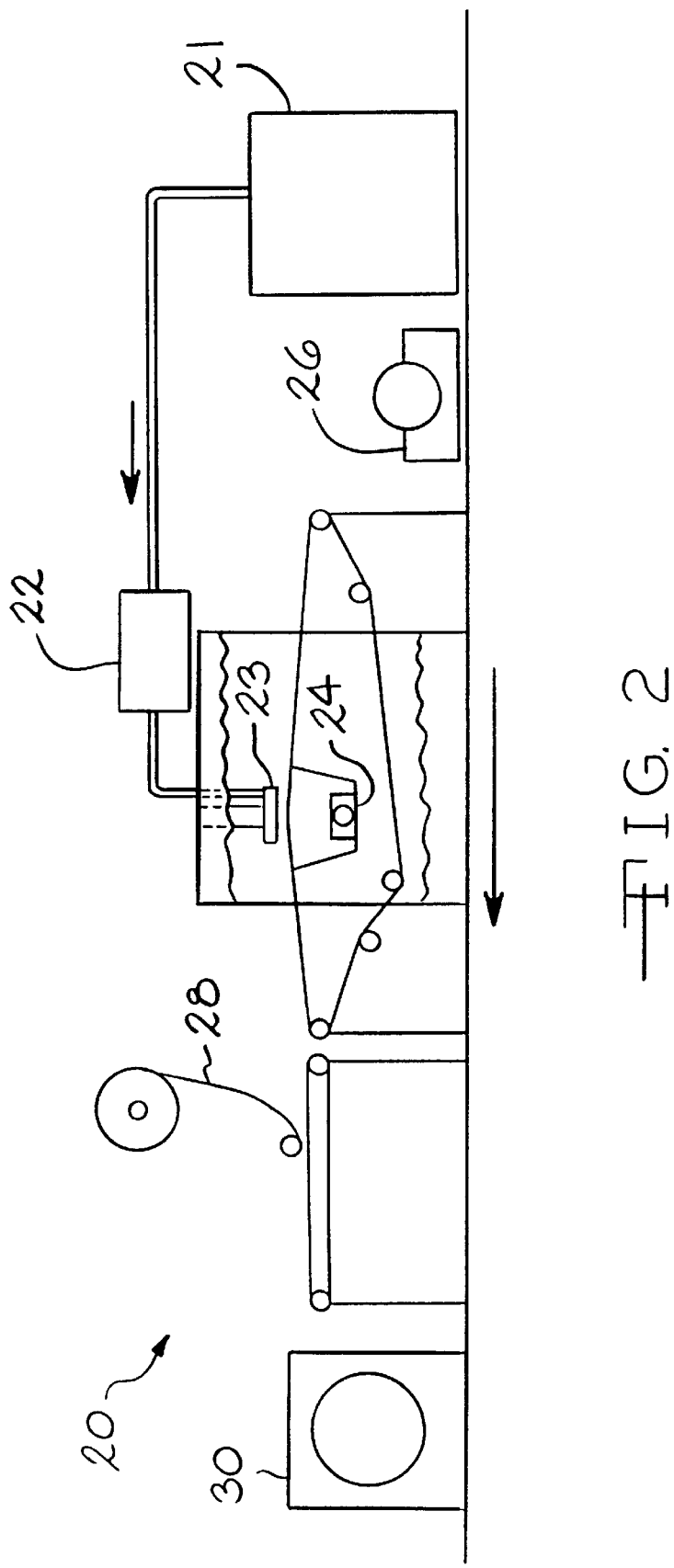
FIG. 2 is a schematic diagram of the process for producing the insulation assembly.

FIG. 2 shows process line 20. Melter 21 supplies hot melt adhesive through pumping station 22 to unit applicator 23. Unit 23 can be any hot melt adhesive applicator. Vacuum box 24 is stationed below unit 23. Insulation batt (not shown) passes between unit 23 and vacuum box 24 where an adhesive (not shown) is applied to the insulation. Typically, the insulation is in the form of a continuous blanket supplied by wool payout machine 26 or in discontinuous batts or boards. Release liner 28 next is applied over the adhesive prior to packaging. Shown is roll up machine 30 for packaging the insulation into a roll. Often the insulation may be cut (not shown) into batts after release liner 28 is applied. The batts may be rolled up with machine 30 or packaged as linear batts. All of these packages are standard insulation packages.

Generally, we applied the adhesive in an amount ranging from 4 to 24 grams per square foot of batt.

FIG. 2 shows the insulation advancing towards unit 23 at an ascending angle and moving away from unit 23 at a descending angle. The angles can be achieved merely by positioning the rollers under the conveyor belt to form these angles.

The following example demonstrates various runs we have carried out.

EXAMPLE

Adhesives comprised of styrene isoprene block copolymer blended with C-5 feedstock hydrocarbon resin and C-9 reinforcing end block resin were used. Commercially available additives such as liquid plastisizing resins and antioxidants were also used. The samples were prepared as follows. The samples were all HV-24 insulation which has a density of about 1.5 pcf. Typically, we used a thickness of insulation of ⅝". Some samples, however, had a density ranging up to 3 pcf and thickness up to 1".

The insulations were faced with either a plain foil or a foil/scrim kraft laminate under existing procedures for facing insulation.

Regarding adhesive coverage, we applied the adhesive at about 8 grams per square foot with some samples ranging up to 15 grams per square foot. The adhesive equipment had an output of 476 pounds per hour and was able to apply 6 strips per square foot. The adhesive strips were 1" wide with a 1" space between stripes. Assuming an adhesive weight of 2 grams per stripe, this would result in 12 grams of adhesive per square foot for a 6' wide product with continuous production and 50' per minute.

The vacuum pull on the vacuum box had a negative pressure of 0.2 to 20 inches of water.

The above samples produced insulation panels with adhesive for securement to sheet metal surfaces of heating and air conditioning units. Samples of the various insulations were subjected to a peel strength test. Specimens of insulation having a 1.5 pcf density and a thickness of ⅝" and measuring 1" by 12" were bonded to a piece of steel painted with acrylic paint. Specimens were bonded to steel painted with an alkyd paint. Other specimens were bonded to galvanized steel and cold-rolled steel.

Testing found the insulating materials acceptable with or without a facing. The surfaces on which the insulation may be applied are bare metals (sheet steel, galvanized, aluminum coated, etc.) and any painted steel (alkyd, acrylic, epoxy, polyester type paint). Appliances using the insulation panels were found useful at temperatures ranging up to 194° F. during normal operation and 428° F. during abnormal operation. The panels also were useful for outdoor use (tested at −20° F.).

We claim:

1. A method for applying a hot melt adhesive to a mineral fiber insulation assembly, comprising the steps of:

advancing a mineral fiber batt towards an adhesive applicator, the batt having at least two opposed surfaces and a thickness therebetween;

disposing a hot melt adhesive from the applicator onto one of the surfaces of the batt; and moving the batt away from the adhesive applicator at a descending angle.

2. A method according to claim 1 including the steps of:

applying a vacuum on the second surface of the batt so as to draw a portion of the adhesive into the thickness of the batt.

3. A method according to claim 2 wherein the vacuum is applied to the batt beneath the adhesive applicator.

4. A method according to claim 1 wherein the fibrous batt advances towards the adhesive at an ascending angle.

5. A method according to claim 1 wherein the batt moves in a generally horizontal direction and the adhesive moves in a direction generally perpendicular to the horizontal direction of the batt.

6. A method according to claim 5 wherein the descending angle forms an angle with the horizontal direction of 5° to 10°.

7. A method of producing a peel and stick insulation product, comprising the steps of:

disposing a hot melt adhesive on a first surface of a fibrous mineral wool batt, wherein said batt includes said first surface, a second surface, and a thickness therebetween; and applying a vacuum to said second surface to draw a portion of said hot melt adhesive into said thickness of said batt.

8. A method according to claim 7 wherein the vacuum is drawn at a negative pressure of 0.2 to 20 inches of water.

9. A method according to claim 7 including the step of disposing a temporary release liner on the adhesive on the surface of the batt.

10. A method according to claim 7, further including:

the step advancing a fibrous batt towards an adhesive applicator, wherein the step of disposing the hot melt adhesive includes disposing the adhesive from the applicator onto said first surface of the batt; and the step of moving the batt away from the adhesive applicator at a descending angle.

11. A method according to claim 10 wherein the vacuum is applied to the batt beneath the adhesive applicator.

12. A method according to claim 10 wherein the fibrous batt advances towards the adhesive at an ascending angle.

13. A method according to claim 10 wherein the batt moves in a generally horizontal direction and the adhesive moves in a direction generally perpendicular to the horizontal direction of the batt.

14. A method according to claim 13 wherein the descending angle forms an angle with the horizontal direction of 5°.

15. A method as set forth in claim 7, wherein said hot melt adhesive is a thermoplastic hot melt adhesive.

16. A method as set forth in claim 7, wherein said hot melt adhesive is disposed on said first surface as strips of adhesive.

17. A method as set forth in claim 16, wherein said strips of adhesive are approximately 1 inch wide.

* * * * *